United States Patent
Zhou

(10) Patent No.: US 8,112,119 B2
(45) Date of Patent: Feb. 7, 2012

(54) PORTABLE ELECTRONIC DEVICE

(75) Inventor: Ri Zhou, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 411 days.

(21) Appl. No.: 12/436,220

(22) Filed: May 6, 2009

(65) Prior Publication Data
US 2010/0151909 A1  Jun. 17, 2010

(30) Foreign Application Priority Data
Dec. 15, 2008 (CN) .......................... 2008 1 0306259

(51) Int. Cl.
*H04B 1/38* (2006.01)

(52) U.S. Cl. ....... 455/563; 455/42; 455/550.1; 455/90.1

(58) Field of Classification Search .................. 455/563, 455/575.4, 550.1, 90.1, 569.2, 42
See application file for complete search history.

(56) References Cited

U.S. PATENT DOCUMENTS

| | | | | |
|---|---|---|---|---|
| 6,349,222 B1 * | 2/2002 | Hafiz | ........................ | 455/569.2 |
| 7,162,283 B2 * | 1/2007 | Bae et al. | ................... | 455/575.4 |
| 2003/0040276 A1 * | 2/2003 | Corn | ............................... | 455/42 |
| 2004/0203496 A1 * | 10/2004 | Bae et al. | ..................... | 455/90.1 |
| 2006/0286998 A1 * | 12/2006 | Fukuda | ...................... | 455/550.1 |
| 2007/0004477 A1 * | 1/2007 | Kim | ........................... | 455/575.4 |
| 2007/0243912 A1 * | 10/2007 | Lee et al. | ................... | 455/575.4 |
| 2008/0280659 A1 * | 11/2008 | Oh et al. | ..................... | 455/575.4 |
| 2008/0304218 A1 * | 12/2008 | Park et al. | ..................... | 361/681 |
| 2009/0036181 A1 * | 2/2009 | Lee | ............................ | 455/575.4 |
| 2010/0240426 A1 * | 9/2010 | Tanaka et al. | .............. | 455/575.4 |

\* cited by examiner

*Primary Examiner* — Jean B Jeanglaude
(74) *Attorney, Agent, or Firm* — Altis Law Group, Inc.

(57) ABSTRACT

An electronic device includes a first housing, a second housing, a drive mechanism and a voice-activated module. The drive mechanism connects the first housing with the second housing. The voice-activated module control the drive mechanism to drive the first housing moving relative to the second housing.

9 Claims, 4 Drawing Sheets

PORTABLE ELECTRONIC DEVICE

BACKGROUND

1. Technical Field

The present disclosure relates generally to portable electronic devices and, more particularly, to a portable electronic device with a voice-activated module.

2. Description of Related Art

A portable electronic device such as a mobile phone or a personal digital assistant is widely used in modern society. The electronic device generally has a first housing, a second housing and a sliding mechanism/hinge connecting the second housing with the first housing. A keypad is configured in the first housing, and a display is configured in the second housing. A user pushes or rotates the second housing, thereby opening/closing the portable electronic device.

However, the user may apply an excessive force on the second housing sometimes, and the portable electronic device can easily be broken. In addition, when hands of the user are injured or disabled, the user may have difficulty using the portable electronic device.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
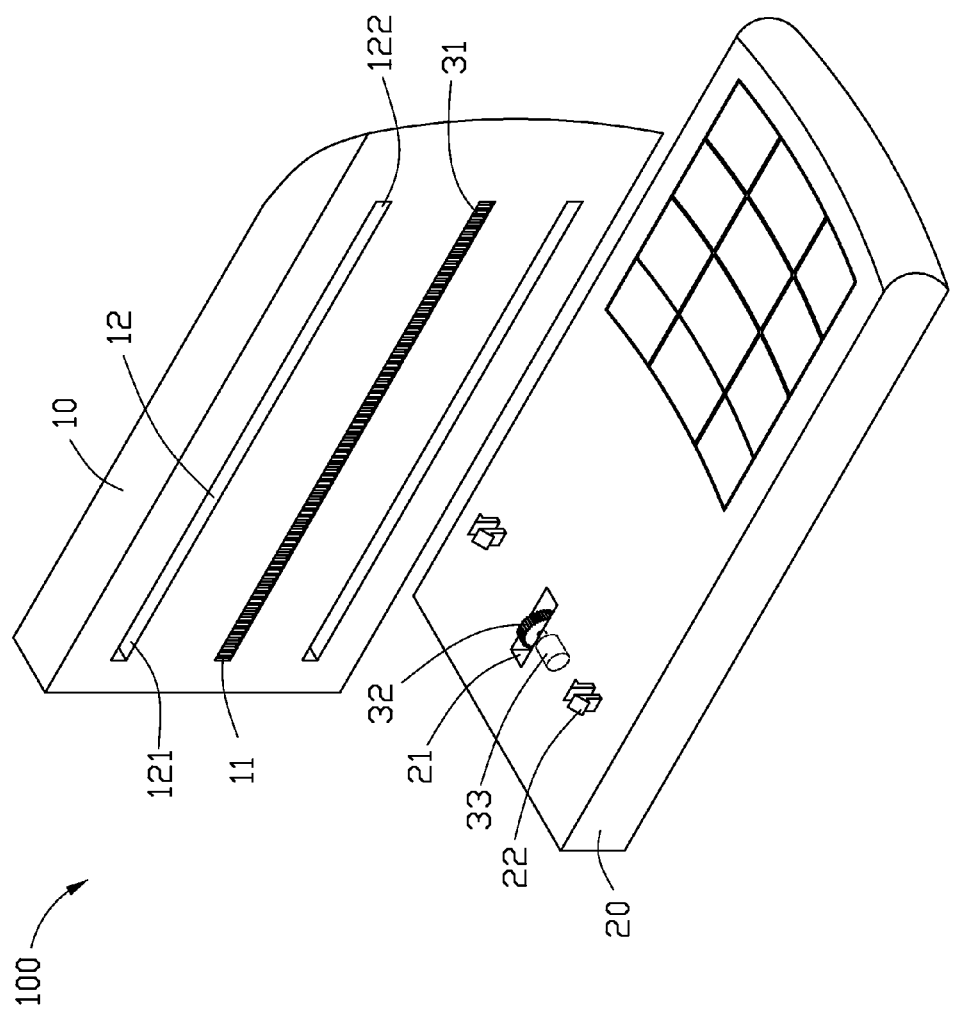
FIG. 1 is an exploded, isometric view of an exemplary embodiment of a portable electronic device.
Figure 2:
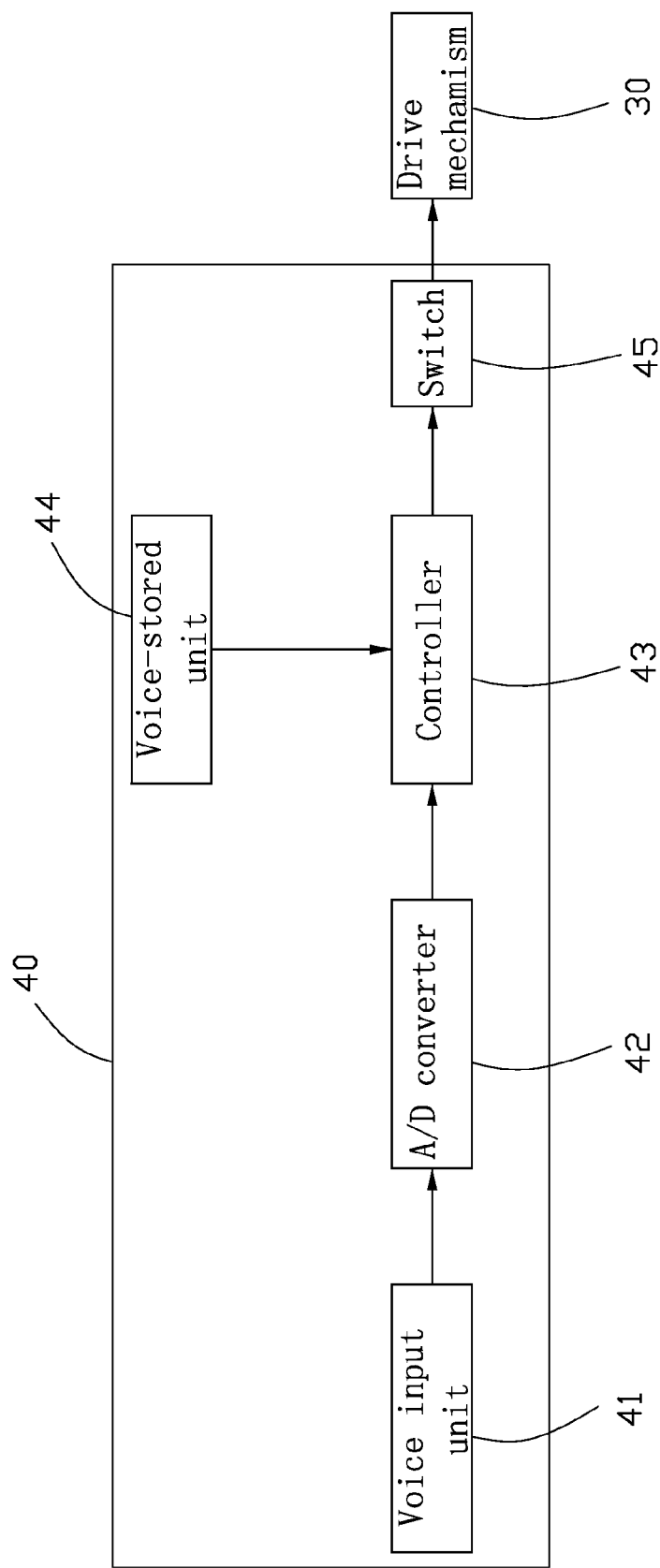
FIG. 2 is a schematic view of a voice-activated module used in the exemplary portable electronic device of FIG. 1

Referring to FIGS. 1 and 2, an exemplary embodiment of a portable electronic device 100 includes a first housing 10, a second housing 20, a drive mechanism 30, and a voice-activated module 40. The drive mechanism 30 slidably connects the second housing 20 to the first housing 10. The voice-activated module 40 can be used to control operation of the drive mechanism 30. In the illustrated embodiment, the portable electronic device 100 is a slide-type portable electronic device.

The first housing 10 defines an elongated assembling groove 11 in a center portion, and two sliding grooves 12 on opposite sides of the assembling groove 11. Each sliding groove 12 includes a first end 121 and an opposite second end 122.

The second housing 20 defines a receiving groove 21 towards one of its ends. Two sliding portions 22 are formed on opposite sides of the receiving groove 21. Each sliding portion 22 is slidably received in one of the sliding grooves 12 when the first housing 10 is in a closed position relative to the second housing 20, the sliding portions 22 are positioned at the first ends 121 of the sliding grooves 12. When the first housing 10 is in an open position relative to the second housing 20, the sliding portions 22 are positioned at the second ends 122 of the sliding grooves 12.

The drive mechanism 30 includes a rack 31, a gear 32, a driving motor 33, and a power source (not shown). The rack 31 is received in the assembling groove 11. The gear 32 is partially received in the receiving groove 21 of the second housing 20, and is connected to the driving motor 33. The driving motor 33 is electrically connected to the power source. When the first housing 10 is coupled to the second housing 20, the gear 32 engages with the rack 31. The driving motor 33 can drive the gear 32 to rotate, thus driving the first housing 10 to slide relative to the second housing 20.

The voice-activated module 40 includes a voice input unit 41, an A/D (analog to digital) converter 42, a controller 43, a voice-stored unit 44, and a switch 45. The voice input unit 41 is electrically connected to the A/D converter 42. The A/D converter 42 and the voice-stored unit 44 are electrically connected to the controller 43. The switch 45 connects the controller 43 to the driving motor 33 of the drive mechanism 30. The voice input unit 41 is configured to receive the external voice, and generating an analog signal, and also to transmit the analog signal to the A/D converter 42. In the illustrated embodiment, the voice input unit 41 is a microphone. The A/D converter 42 is configured for receiving the analog signal, and transferring the analog signal to a digital signal. The voice-stored unit 44 is configured for storing predetermined voice commands. The controller 43 is configured for receiving the digital signal from the A/D converter 42, and comparing the data of the digital signal with the voice commands, thus performing a selected operation corresponding the voice command on the switch 45. When the switch 45 is turned on, the controller 43 can control the driving motor 33 to rotate, thus opening/closing the portable electronic device 100.

Figure 3:
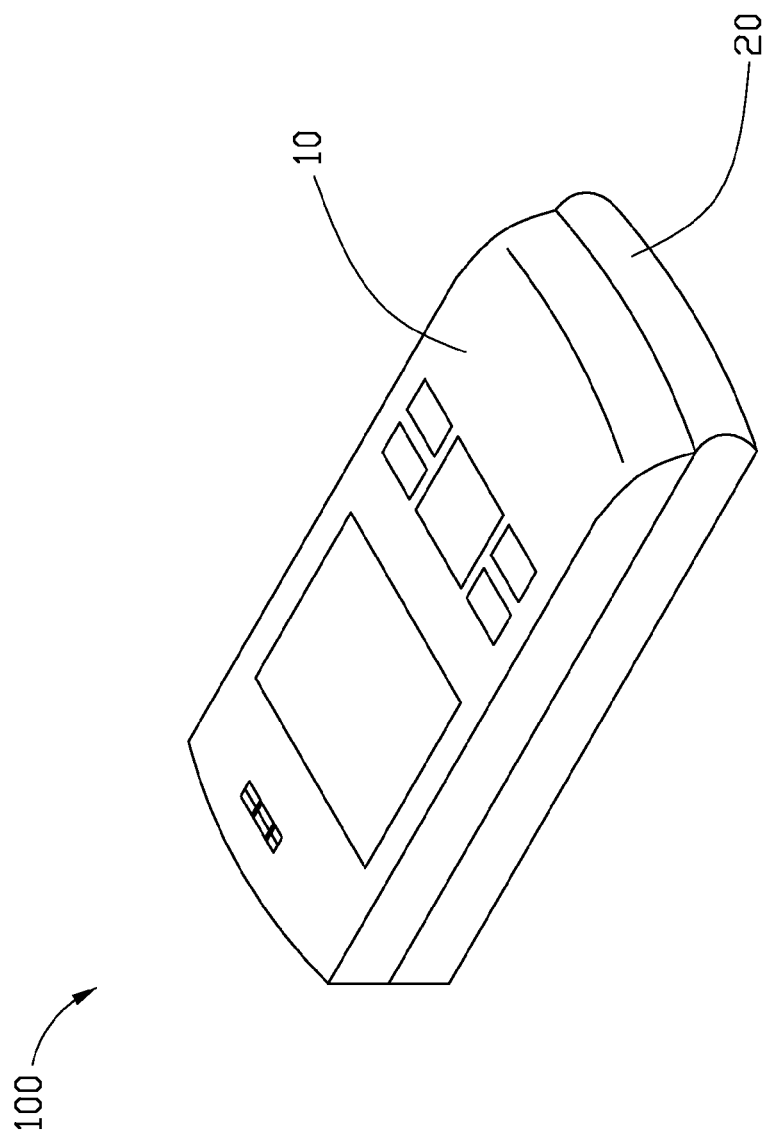
FIG. 3 is an assembled, isometric view of the portable electronic device of FIG. 1, with the exemplary portable electronic device in a closed state.
Figure 4:
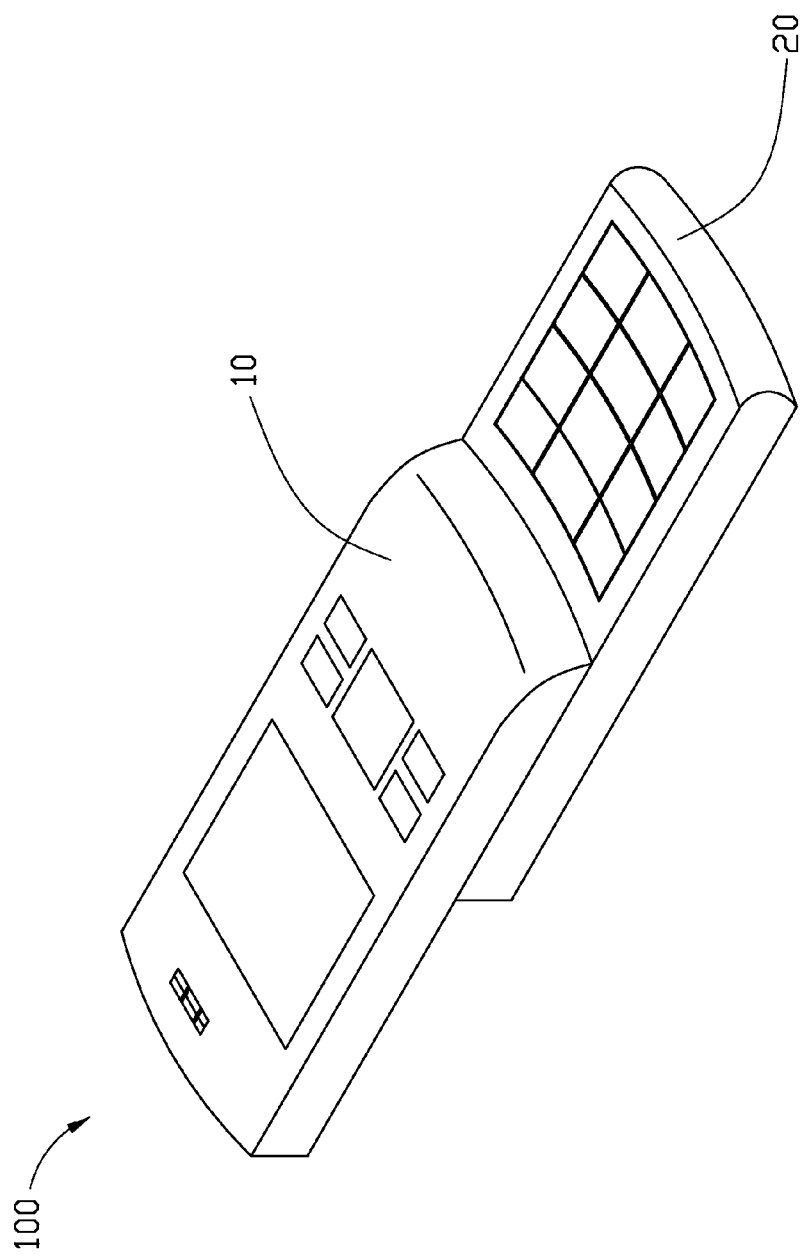
FIG. 4 is an assembled, isometric view of the portable electronic device of FIG. 1, with the exemplary portable electronic device in an open state.

Referring to FIG. 3, the portable electronic device 100 is in a closed state. When the portable electronic device 100 needs to be opened, a voice command is inputted for opening the portable electronic device 100. The voice input unit 41 receives the voice command and generates an analog signal. The analog signal is transmitted to the A/D converter 42. The A/D converter 42 receives the analog signal, and transfers the analog signal to the digital signal. The digital signal is transmitted to the controller 43. The controller 43 compares the digital signal with the stored voice commands in the voice-stored unit 44. If the digital signal accords with the voice commands, the controller 43 controls the switch 45 to turn on, thus controlling the driving motor 33 to rotate. Therefore, the first housing 10 slides to an opened position as shown in FIG. 4. After that, the switch 45 is controlled by the 43 to turn off. The portable electronic device 100 can be closed by the voice-activated module 40 according to above described steps.

The the portable electronic device 100 can be opened by inputting the voice command to the portable electronic device 100 orally using the voice-activated module 40. Therefore, the portable electronic device 100 is convenient for use. In addition, a speed of opening the portable electronic device 100 can be controlled by the voice-activated module 40, thus preventing the portable electronic device 100 from damages.

It should be pointed out that the switch 45 may be a delay switch. The delay switch can turn off automatically after being turned on over a predetermined time. The portable electronic device 100 may be a foldable portable electronic device with the first housing 10 and the second housing 20 connected by a hinge. The voice-activated module 40 can drive the first housing 10 rotating relative to the second housing 20. In addition, a button for operating the switch can be positioned on the portable electronic device 100. the button can be actuated to open/close the portable electronic device 100 when in a noisy environment.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A portable electronic device, comprising:
   a first housing;
   a second housing;
   a drive mechanism connecting the first housing with the second housing, the drive mechanism comprising a driving motor;
   wherein the portable electronic device further comprises a voice-activated module, the voice-activated module electrically connecting with the driving motor and controlling the driving motor of the drive mechanism to drive the first housing moving relative to the second housing with an adjustable speed to any positions.

2. The portable electronic device of claim 1, wherein the voice-activated module comprises a voice input unit, an A/D converter, a controller, and a voice-stored unit; the voice input unit is electrically connected to the A/D converter; the A/D converter and the voice-stored unit are electrically connected to the controller.

3. The portable electronic device of claim 2, wherein the voice-activated module further comprises a switch, the switch connects the controller to the drive mechanism.

4. The portable electronic device of claim 2, wherein the driving motor is electrically connected to the controller.

5. The portable electronic device of claim 2, wherein the drive mechanism further comprises a rack and a gear; the rack is fixedly connected to the first housing; the driving motor is positioned on the second housing, and the gear is fixedly connected to the driving motor; the gear is engaged with the rack.

6. The portable electronic device of claim 5, wherein the first housing defines an elongated assembling groove; the rack is received in the elongated assembling groove of the first housing.

7. The portable electronic device of claim 6, wherein the second housing defines a receiving groove; the gear is partially received in the receiving groove of the second housing.

8. The portable electronic device of claim 7, wherein first housing defines two sliding grooves on opposite sides of the elongated threaded groove; two sliding portions are formed on opposite sides of the receiving groove; the sliding portions are slidably received in the sliding grooves of the first housing.

9. The portable electronic device of claim 1, wherein the electronic device is a slide-type portable electronic device.

\* \* \* \* \*